US005640518A

United States Patent [19]
Muhich et al.

[11] Patent Number: 5,640,518
[45] Date of Patent: Jun. 17, 1997

[54] ADDITION OF PRE-LAST TRANSFER ACKNOWLEDGE SIGNAL TO BUS INTERFACE TO ELIMINATE DATA BUS TURNAROUND ON CONSECUTIVE READ AND WRITE TENURES AND TO ALLOW BURST TRANSFERS OF UNKNOWN LENGTH

[75] Inventors: John Stephen Muhich; Ronald Xavier Arroyo, both of Travis County; Charles Gordon Wright; Lawrence Joseph Merkel, both of Williamson County, all of Tex.

[73] Assignee: International Business Machines Corporation, Armonk, N.Y.

[21] Appl. No.: 588,150

[22] Filed: Jan. 18, 1996

Related U.S. Application Data

[63] Continuation of Ser. No. 355,863, Dec. 14, 1994, abandoned.

[51] Int. Cl.$^6$ ...................................................... G06F 13/00
[52] U.S. Cl. ........................... 395/290; 395/855; 395/856; 395/860; 395/741
[58] Field of Search ............................. 395/800, 200.05, 395/200.13, 200.14, 285, 286, 287, 290, 856, 860, 741, 476, 478, 855

[56] References Cited

U.S. PATENT DOCUMENTS

| | | | |
|---|---|---|---|
| 4,449,183 | 5/1984 | Flahive et al. | 395/478 |
| 4,627,018 | 12/1986 | Trost et al. | 395/676 |
| 5,276,818 | 1/1994 | Okazawa et al. | 395/325 |
| 5,388,232 | 2/1995 | Sullivan et al. | 395/285 |
| 5,473,762 | 12/1995 | Krein et al. | 395/287 |

OTHER PUBLICATIONS

"Disk Performance Improvement Through Transfer Rate Mismatch Compensation" IBM Technical Disclosure Bulletin, V30 N12, dtd May 1988, pp. 390–393.

"Automatic Bus Pacing on a Micro Channel", IBM Technical Disclosure Bulletin, V33 N3B, dtd Aug. 1990, pp. 258–261.

Motorola "PowerPC 601, RISC Microprocessor User's Manual", Chapters 8 and 9.

*Primary Examiner*—Meng-ai T. An
*Attorney, Agent, or Firm*—Whitham, Curtis, Whitham & McGinn; Anthony V. England

[57] ABSTRACT

A mechanism is provided in a microprocessor bus interface to eliminate the turnabout in those cases where the same slave is involved in consecutive read data bus tenures or where the same master and slave are involved in consecutive write data bus tenures. A new optional signal is added to the bus interface, called pre-last transfer acknowledge. The signal is asserted by the slave one cycle before the last transfer acknowledge signal is asserted. The signal is intended to be received by the system's bus arbiter. If the current data tenure and the next data tenure are both read operations directed to the same slave (such as the memory controller) or both write operations from the same master to the same slave, then the arbiter may grant the data bus to the master of the next data tenure the cycle following the assertion of the pre-last transfer acknowledge indicator. This allows the arbiter to grant the bus a cycle earlier than it normally could (where it would have to see the final transfer acknowledge signal before it could grant the bus). Thus, the bus turnaround cycle is eliminated and data bus bandwidth is increased by up to twenty percent.

11 Claims, 9 Drawing Sheets

ADDITION OF PRE-LAST TRANSFER ACKNOWLEDGE SIGNAL TO BUS INTERFACE TO ELIMINATE DATA BUS TURNAROUND ON CONSECUTIVE READ AND WRITE TENURES AND TO ALLOW BURST TRANSFERS OF UNKNOWN LENGTH

This is a continuation of application Ser. No. 08/355,863 filed Dec. 14, 1994, now abandoned.

BACKGROUND OF THE INVENTION

1. Field of the Invention

The present invention generally relates to data transfers from a memory unit to a microprocessor and, more particularly, to a slave-to-arbiter signal which indicates that the end of a data tenure will be the next cycle, thus eliminating a bus turnaround cycle and increasing the effective bandwidth of the data bus by up to twenty percent.

2. Description of the Prior Art

The bus interface for modern microprocessors often specifies one or more bus cycles of dead time between data tenures to allow the previous master and slave to restore control signals and get off the system bus. This allows handoff between the previous master/slave pair and the next master/slave pair without any bus contention problems. Assuming that burst transfers require four bus cycles to complete, the dead cycle between transfers reduces maximum bus bandwidth by 20%. In cases where the same slave is involved in consecutive read data bus tenures or when the same master and slave are involved in multiple write data bus tenures, this turnaround cycle is unnecessary and reduces the potential performance of the microprocessor. A mechanism is needed to eliminate the turnaround in these cases.

SUMMARY OF THE INVENTION

It is therefore an object of the present invention to provide a mechanism in a microprocessor bus interface to eliminate the turnaround in those cases where the same slave is involved in consecutive read data bus tenures or when the same master and slave are involved in consecutive data bus write tenures.

It is another object of the invention to provide a mechanism to allow burst transfers where the length of the transfer is unknown at the start of the transfer.

According to the invention, there is provided a new optional signal to a bus interface, called a pre-last transfer acknowledge or a pre-last data valid signal which, in a preferred embodiment of the invention, is denoted as the $\overline{\text{PLTA}}$ signal. The signal is asserted by the slave one cycle before the last transfer acknowledge or data valid signal is asserted. In a preferred embodiment of the invention, this transfer acknowledge signal is denoted as the $\overline{\text{TA}}$ signal. The pre-last transfer acknowledge signal is intended to be received by the system's bus arbiter. If the current data tenure and the next data tenure are both read operations directed to the same slave (such as the memory controller) or both write operations from the same master to the same slave, then the arbiter may grant the data bus to the master of the next data tenure the cycle following the assertion of the pre-last transfer acknowledge indicator. This allows the arbiter to grant the bus a cycle earlier than it normally could (where it would have to see the final transfer acknowledge signal before it could grant the bus). Thus, the bus turnaround cycle is eliminated and data bus bandwidth is increased by up to twenty percent.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The invention is described in terms of the bus design for the PowerPC® microprocessor. The PowerPC® microprocessor was jointly developed by Motorola and International Business Machines (IBM) Corporation and is a reduced instruction set computer (RISC). However, it will be understood by those skilled in the art that the bus for the PowerPC® microprocessor is applicable to other and different microprocessors and, furthermore, the invention is not limited to the PowerPC® bus.

Figure 1:
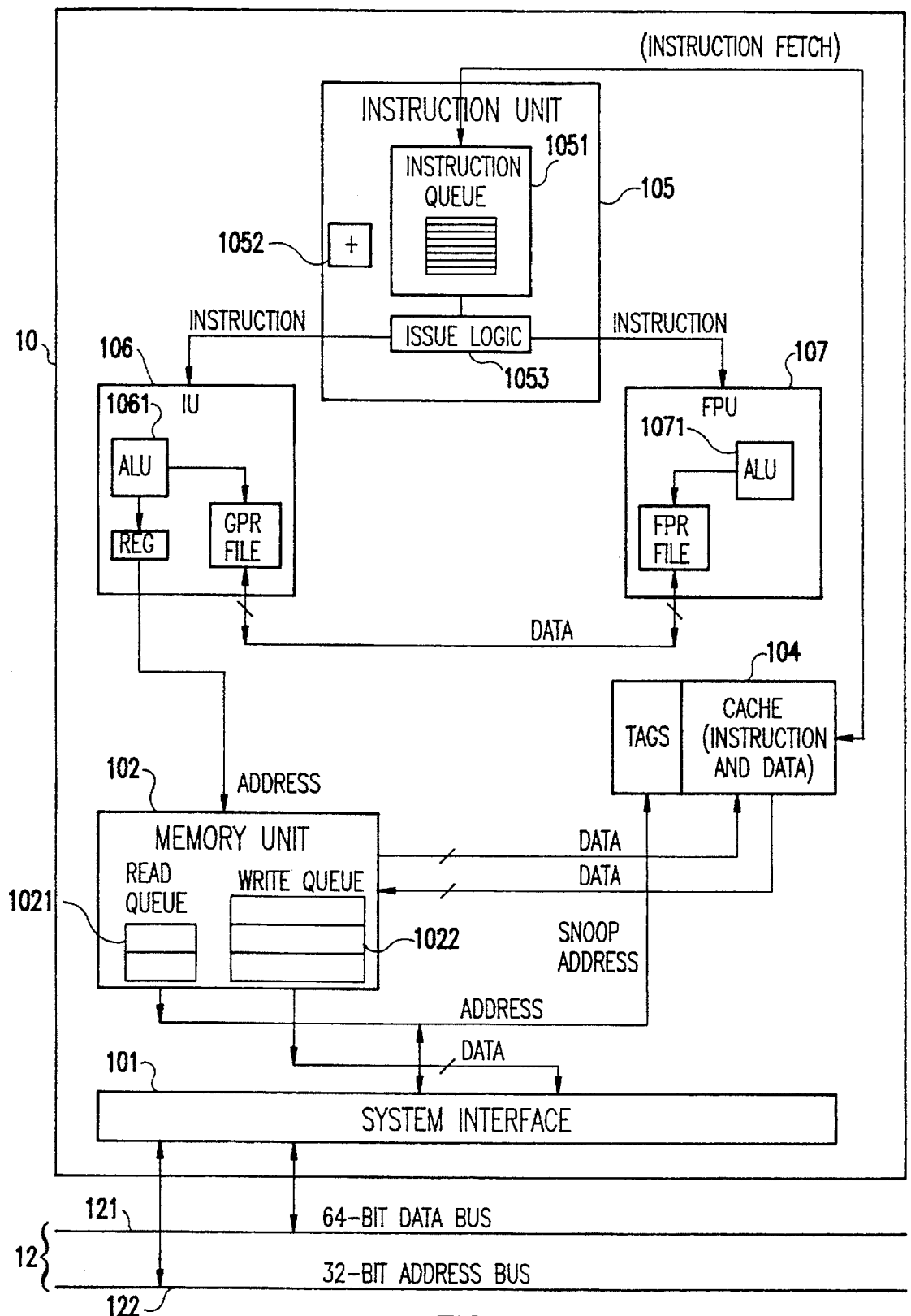
FIG. 1 is a block diagram of a microprocessor on which the invention may be implemented.

Referring now to the drawings, and more particularly to FIG. 1, there is shown a block diagram of a microprocessor, such as the PowerPC®, on which the present invention may be implemented. The microprocessor 10 is connected via its system interface 101 to a system bus 12 comprising a 64-bit data bus 121 and a 32-bit address bus 122. The system bus 12 is connected to a variety of input/output (I/O) adapters and a system memory (not shown). The microprocessor 10 uses the system bus 12 for performing reads and writes to system memory, among other things. Arbitration for both address and data bus mastership is performed by a central, external arbiter (not shown).

The system interface 101 is connected to a memory unit 102, which consists of a read queue 1021 and a write queue 1022. The read queue 1021 contains addresses for read operations, and the write queue 1022 contains addresses and data for write operations. The memory unit 102 is connected to a cache 104 which stores both instructions and data. The cache may be split into instruction and data sections. Instructions and data (operands) in cache 104 are accessed by the instruction unit 105, consisting of an instruction queue 1051, program counter 1052, and issue logic 1053. There is at least one execution unit and, in some microprocessors there are a plurality of execution units, here represented by an integer unit (IU) 106 and a floating point unit (FPU) 107. The issue logic 1053 determines the type of instruction and dispatches it to a corresponding execution unit. The IU 106 includes an arithmetic logic unit (ALU) 1061 which performs scalar operations, and the FPU 107 includes an ALU 1071 which performs floating point operations. The data outputs from each of the IU 106 and the FPU 107 may be written to cache 104 from where the data is transferred to the memory unit 102 for writing to system memory.

Instructions and operands are automatically fetched from the system memory via the cache 104 into the instruction unit 105 where they are dispatched to the execution units. Load and store instructions specify the movement of operands to and from the integer and floating-point units and the memory system. When an instruction or data access is received, the address is calculated. The calculated address is used to check for a hit in the cache. If the access misses in the cache 104, the address is used to access system memory. All read and write operations are handled by the memory unit 102. Memory is accessed through an arbitration mechanism that allows devices to compete for bus mastership.

Figure 2:
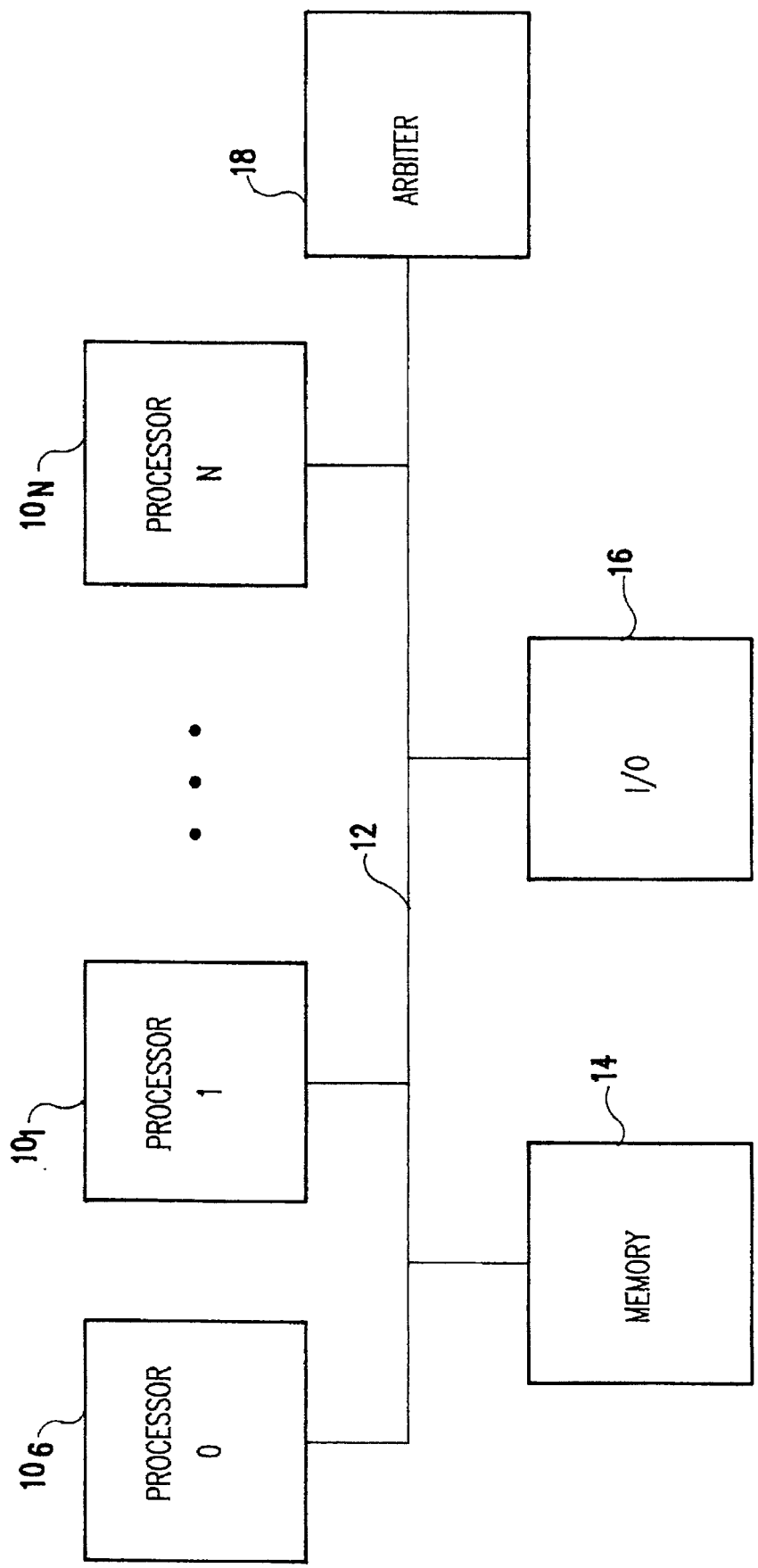
FIG. 2 is a block diagram of a computer system including one or more microprocessors as illustrated in FIG. 1 and attached to the system bus.

FIG. 2 is a high level block diagram showing a computer system having a plurality of processors $10_0$ to $10_N$ connected to the system bus 12 together with a main memory 14, typically a random access memory (RAM), an input/output (I/O) channel 16, and an arbiter 18. One or more of the processors may operate as the central processing unit (CPU), while others may be co-procesors having dedicated processing functions, such as video display. The I/O channel 16 may connect to one or more direct access storage devices (DASDs), such as a hard disk drive. The arbiter 18 controls access to the system bus 12 by granting control to one potential master at a time. Each such potential master has its own unique bus grant.

Figure 3:
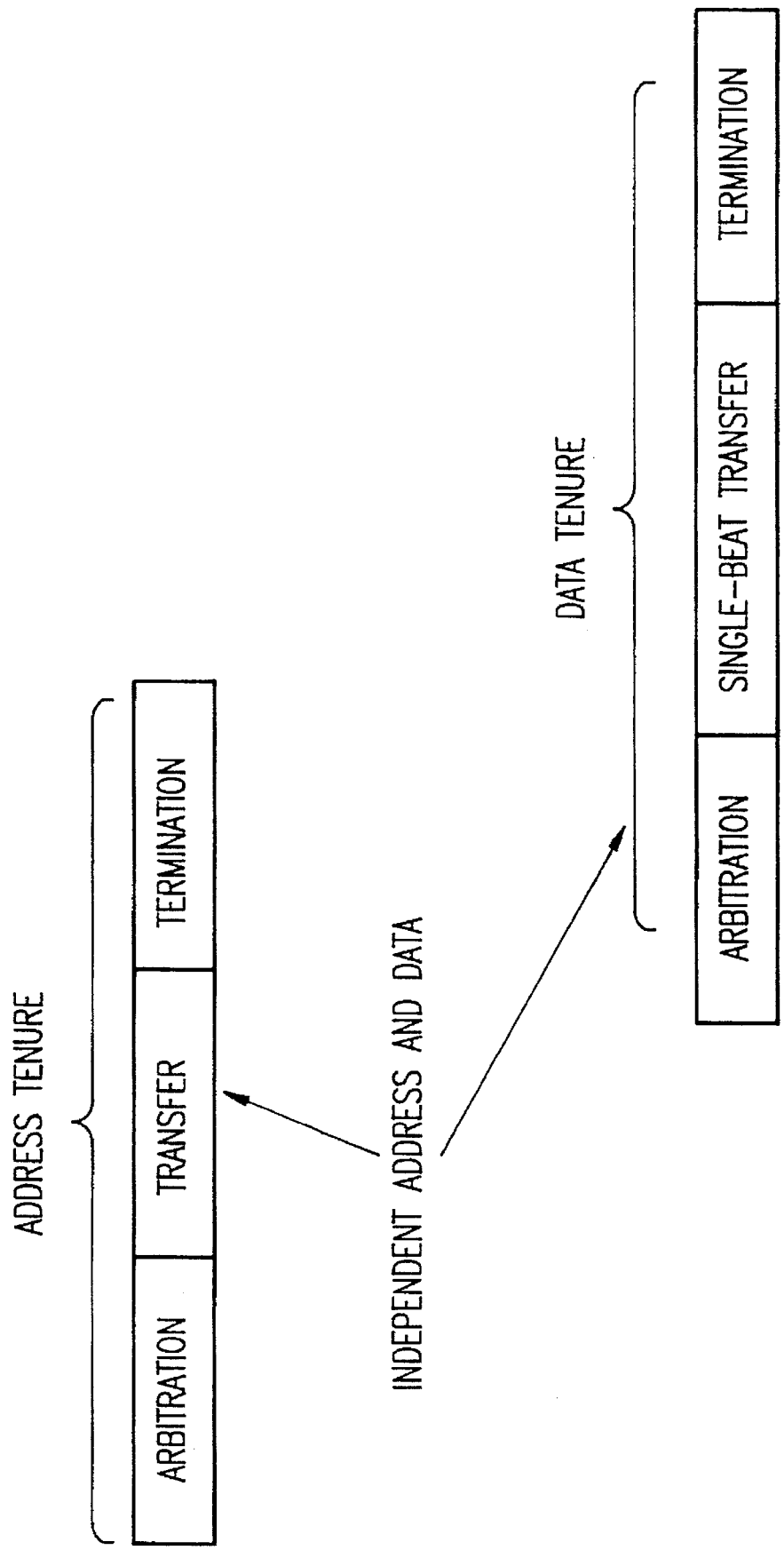
FIG. 3 is a block diagram showing the overlapping tenures on a bus for a single-beat transfer.

Memory accesses in the PowerPC® microprocessor are divided into address and data tenures. There are three phases of each tenure; bus arbitration, transfer, and termination, as shown in FIG. 3. Note that address and data tenures are distinct from one another and that they can overlap. Having independent address and data tenures allows address pipelining and split-bus transactions to be implemented at the system level in multi-processor systems. FIG. 3 shows a data transfer that consists of a single-beat transfer of as many as 64 bits. Four-beat burst transfers of 32-byte cache sectors require data transfer termination signals for each bit of data.

To begin the data tenure, the PowerPC® microprocessor arbitrates for mastership of the data bus. After the PowerPC® microprocessor is the data bus master, it samples the data bus for read operations or drives the data bus for write operations. The data parity and data parity error signals ensure the integrity of the data transfer. Data termination signals are required for each data beat in a data transfer. In a single-beat transaction, the data termination signals also indicate the end of the tenure, while in burst accesses, the data termination signals apply to individual beats and indicate the end of the tenure only after the final data beat.

In the PowerPC® microprocessor, four signals are used to terminate data bus transactions; $\overline{TA}$, $\overline{DRTRY}$ (data retry), $\overline{TEA}$ (transfer error acknowledge), and in some cases $\overline{ARTRY}$. The $\overline{TA}$ signal indicates normal termination of data transactions. The $\overline{DRTRY}$ signal indicates invalid read data in the previous bus clock cycle. The $\overline{TEA}$ signal indicates a non-recoverable bus error event. A $\overline{DRTRY}$ signal can also terminate a data bus transaction, but only if it occurs before the first assertion of the $\overline{TA}$ signal.

Figure 4:
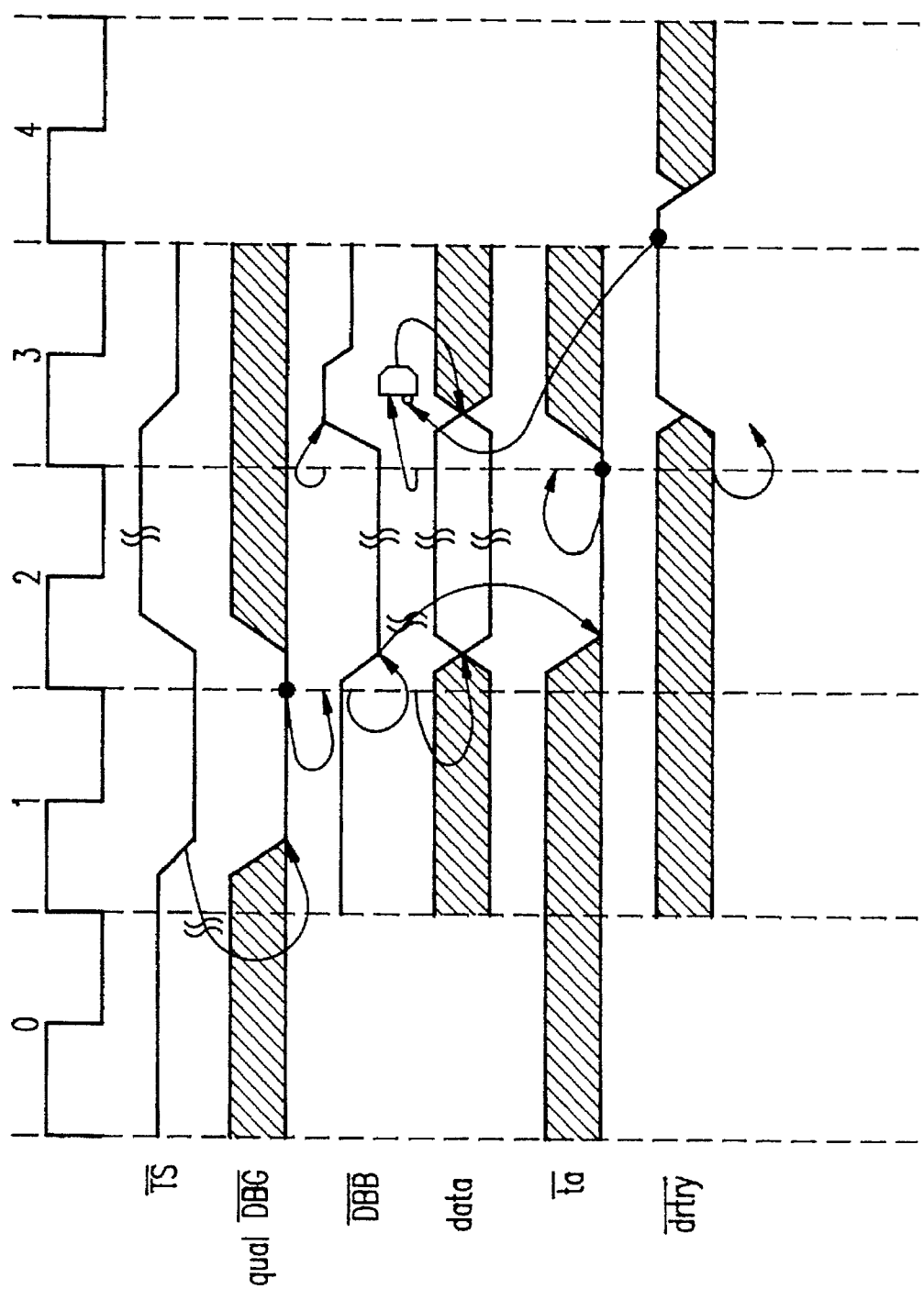
FIG. 4 is a timing chart illustrating a normal single-beat read termination.
Figure 5:
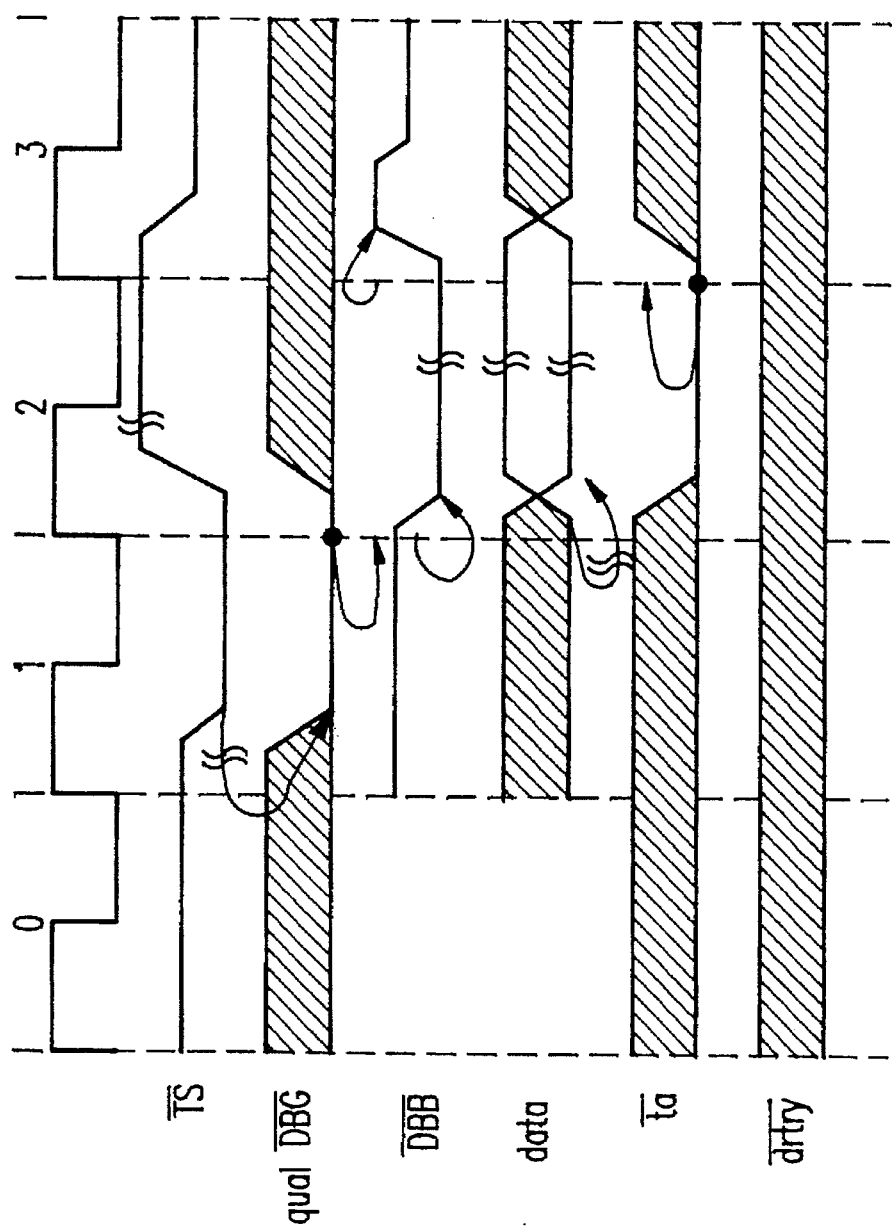
FIG. 5 is a timing chart illustrating a normal single-beat write termination.
Figure 6:
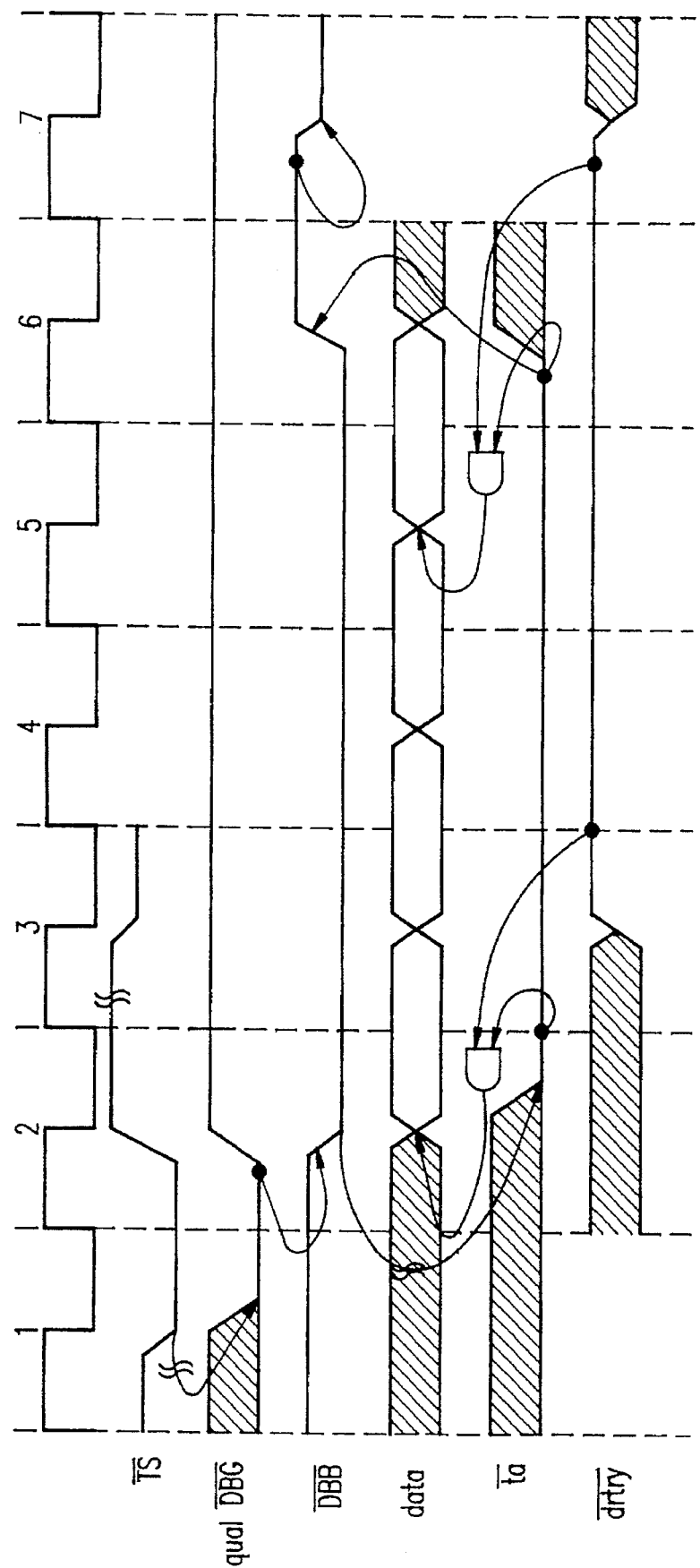
FIG. 6 is a timing chart illustrating a normal burst termination.
Figure 7:
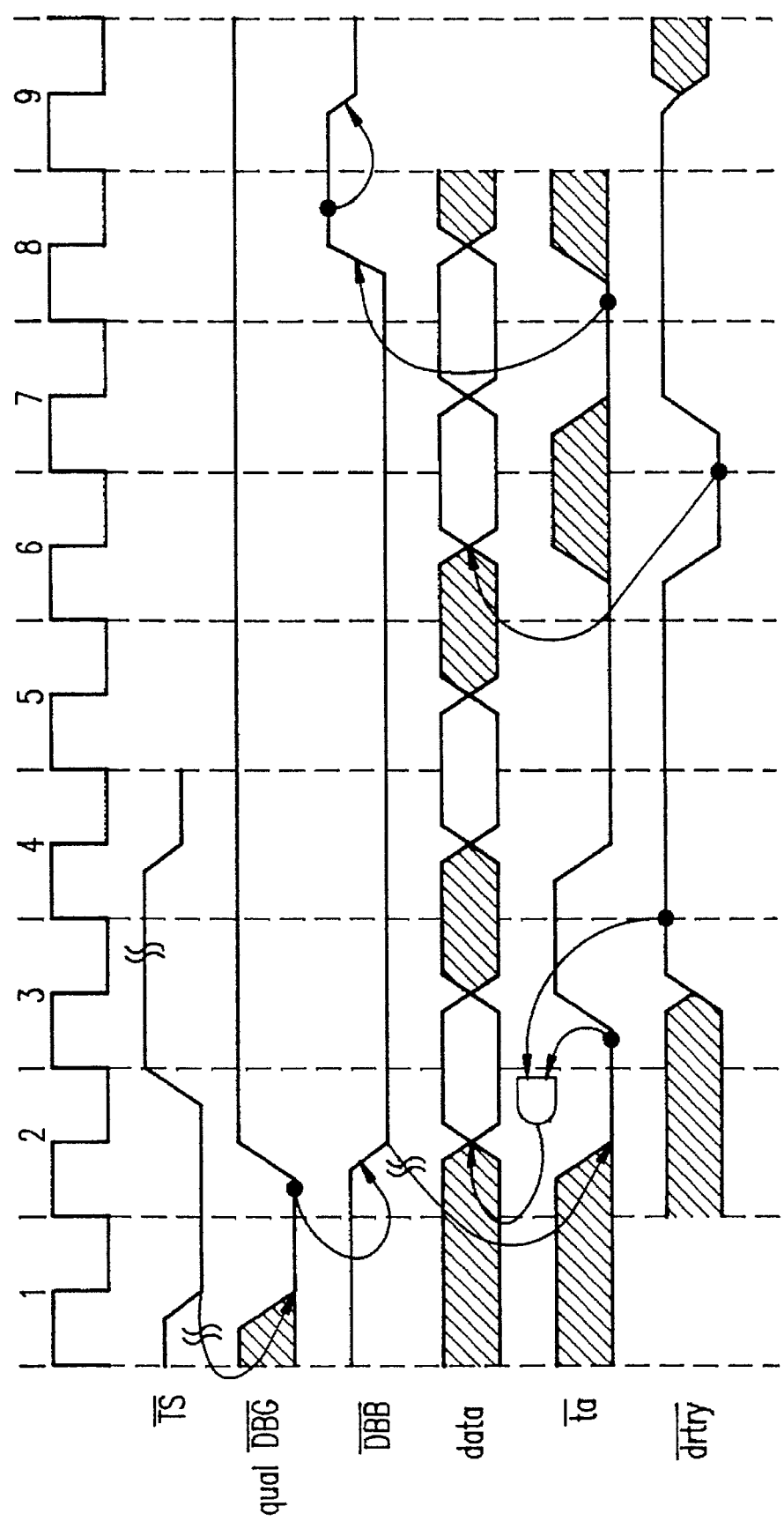
FIG. 7 is a timing chart illustrating a read burst with $\overline{\text{TA}}$ wait states and $\overline{\text{DRTRY}}$.

Normal termination of a single-beat data read operation occurs when the $\overline{TA}$ signal is asserted by a responding slave, as shown in FIG. 4. Normal termination of a single-beat write transaction occurs when the $\overline{TA}$ signal is asserted by a responding slave, as shown in FIG. 5. For read bursts, the $\overline{DRTRY}$ signal may be asserted one bus clock cycle after the $\overline{TA}$ signal is asserted to signal that the data presented with $\overline{TA}$ is invalid and that the processor must wait for the negation of $\overline{DRTRY}$ before forwarding data to the processor, as shown in FIG. 6. Thus, a data beat can be speculatively terminated with $\overline{TA}$ and then one bus clock cycle later confirmed with the negation of $\overline{DRTRY}$. The $\overline{DRTRY}$ signal is valid only for read transactions. $\overline{TA}$ must be asserted one bus clock cycle before the first bus clock cycle; otherwise, the results are undefined. FIG. 7 shows the effect of using $\overline{DRTRY}$ during a burst read. It also shows the effect of using $\overline{TA}$ to pace the data transfer rate. The PowerPC® microprocessor data pipeline is interrupted in bus cycle 3 and does not proceed until bus clock cycle 4 when the $\overline{TA}$ signal is reasserted.

In the context of the PowerPC® microprocessor, the present invention is concerned with the $\overline{TA}$ signal, and no further description will be given of the $\overline{DRTRY}$ (data retry), $\overline{TEA}$ (transfer error acknowledge), and $\overline{ARTRY}$ signals. For more information on the PowerPC® microprocessor, the reader is referred to *PowerPC 601 RISC Microprocessor User's Manual.*

Figure 8:
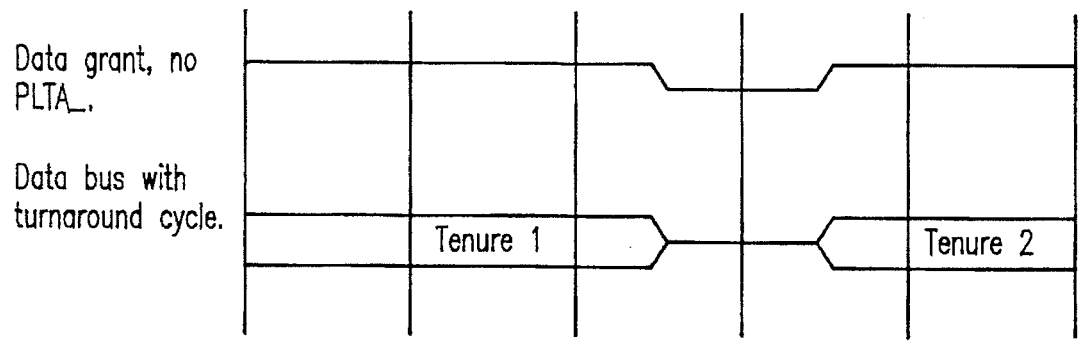
FIG. 8 is a timing chart illustrating data bus transition with bus turnaround cycle.

Since the PowerPC® microprocessor bus defines burst transfers that require a minimum of four bus cycles to complete, the dead cycle between transfers reduces maximum bus bandwidth by twenty percent. The data bus transition according to the protocol of the PowerPC® microprocessor protocol is summarized in FIG. 8. As clearly illustrated, the data bus has a turnaround cycle which limits the bus bandwidth. In cases where the same slave is involved in consecutive read data bus tenures or the same master and same slave are involved in consecutive write data bus tenures, this turnabout cycle is unnecessary. Moreover, the data bus of the PowerPC® microprocessor interface is defined to have one dead bus cycle between data tenures in all cases. Where the majority of the data tenures are reads from memory or where the same slave is involved in consecutive read data tenures or the same master and same slave are involved in consecutive write data bus tenures, no bus turnaround cycle is necessary.

Figure 9:
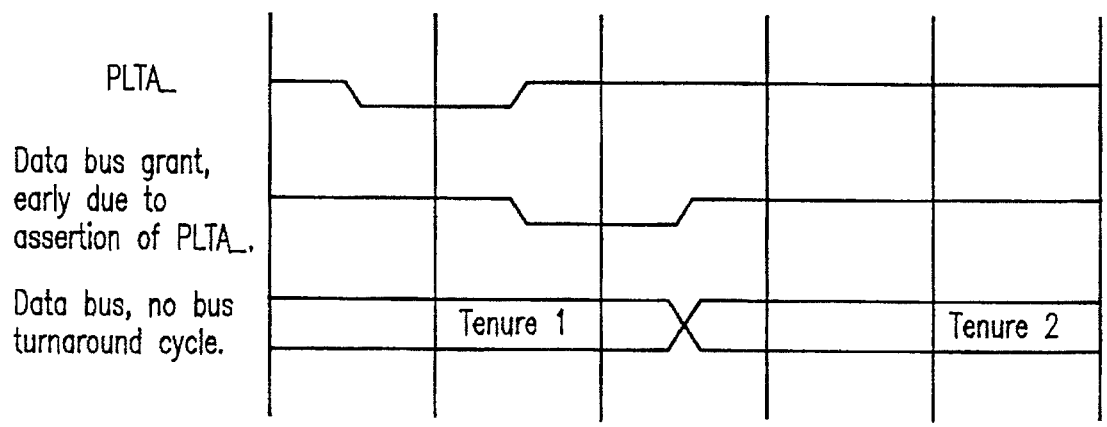
FIG. 9 is a timing chart illustrating data bus transition with no bus turnaround cycle.

According to the present invention, a new optional signal is added to the bus interface, called pre-last transfer acknowledge ($\overline{PLTA}$). The signal is asserted by the slave one cycle before the last $\overline{TA}$ is asserted, as illustrated in FIG. 9. This signal is intended to be received by the system's bus arbiter 18 (shown in FIG. 2). If the current data tenure and the next data tenure are both read operations directed to the same slave (such as the memory controller) or both write operations from the same master to the same slave, then the arbiter may grant the data bus to the master of the next data tenure the cycle following the assertion of $\overline{PLTA}$ indicator, allowing the arbiter to grant the bus a cycle earlier than it normally could (where it would have to see the final $\overline{TA}$ before it could grant the bus). Thus, the bus turnaround cycle is eliminated and data bus bandwidth is increased by up to twenty percent.

Figure 10:
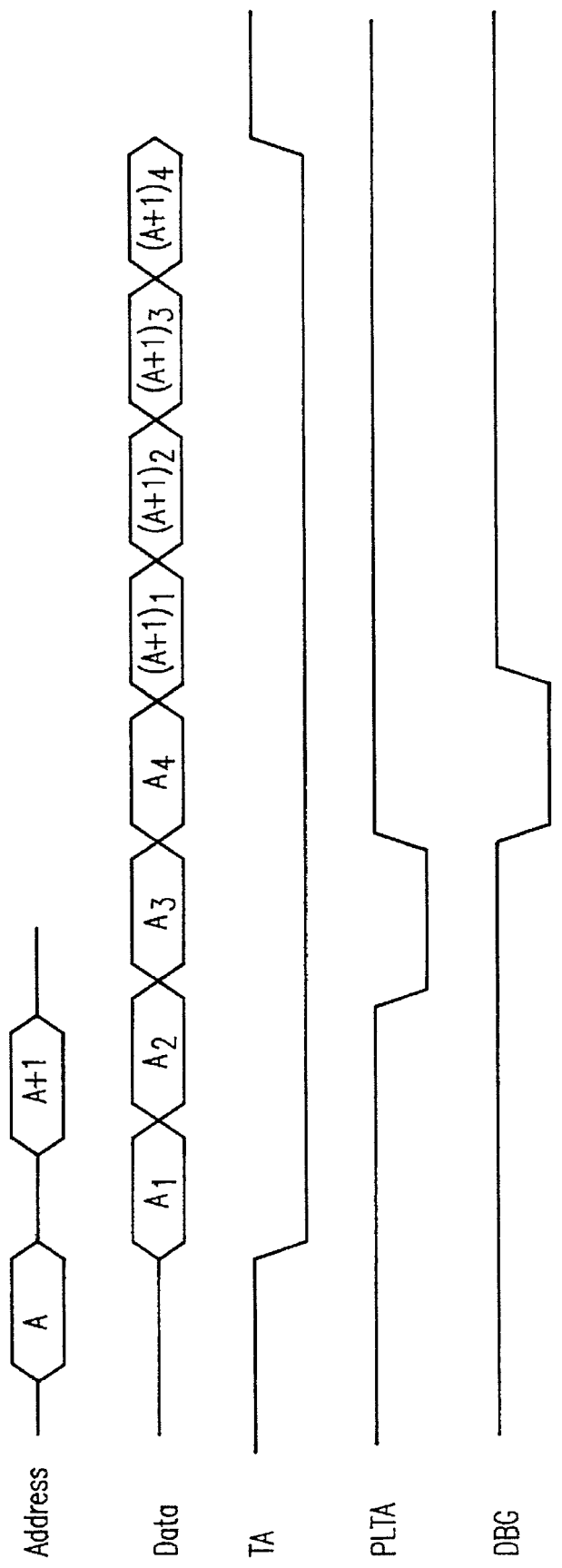
FIG. 10 is a timing chart illustrating a burst transfer where the length of the transfer is unknown at the start of the transfer.

Also according to the present invention, burst transfers of initially unknown length can be created. This is illustrated in FIG. 10, to which reference is now made. When a read (or write) transfer begins at address A, it will be a transfer of some number of bytes (32 for the PowerPC®). The address for block A+1 could be broadcast during the data tenure of A, and the $\overline{PLTA}$ signal could then be asserted the cycle before the last $\overline{TA}$ signal of the data tenure for address A, effectively extending the data bus tenure to two burst blocks. This sequence can be repeated any number of times, within some possible system restrictions. Therefore, a block of memory has been moved, and the length of the block was unknown at the start of the tenure.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a microprocessor bus interface servicing a plurality of processors on a system bus and having a turnaround cycle between a current tenure and a next tenure on said bus, each of said tenures serving a respective master device and a respective slave device, said turnaround cycle being provided to allow the current master and slave to restore control signals and exit the system bus so as to avoid bus contention problems, a method of eliminating said turnaround cycle between successive data bus tenures, comprising the steps of:

arbitrating for mastership of the system bus and granting the bus to a master for data transfer between the master and a slave during a bus tenure, the slave normally generating a data termination signal for each data beat in a data transfer;

asserting a single pre-last transfer acknowledge signal by the slave one cycle before a last transfer acknowledge signal; and granting the data bus to a next master on a cycle following assertion of the pre-last transfer acknowledge in cases where bus turnaround may be eliminated without creating bus contention problems between said previous and current data tenures, such cases being where the same slave is involved in consecutive read data bus tenures or where the same master and slave are involved in consecutive write data bus tenures, thereby eliminating the bus turnaround cycle and effectively increasing the data bus bandwidth.

2. The method recited in claim 1 further comprising the step of transferring data from a system memory to a microprocessor when the microprocessor is the master of the system bus.

3. The method recited in claim 2 further comprising the step of continuing the bus tenure with each read transfer by broadcasting a next address in memory until the system memory asserts the pre-last transfer acknowledge, effectively executing a burst read tenure initially having an unknown length.

4. The method recited in claim 1 further comprising the step of transferring data from a microprocessor to a system memory when the microprocessor is the master of the system bus.

5. The method recited in claim 4 further comprising the step of continuing the bus tenure with each write transfer by broadcasting a next address in memory until the microprocessor asserts the pre-last transfer acknowledge, effectively executing a burst write tenure initially having an unknown length.

6. A computer system comprising:

a system bus and an arbiter connected to said system bus;

a plurality of devices connected to said system bus including at least one microprocessor, a system memory and an input/output channel, said arbiter arbitrating mastership of the system bus and granting the bus to a master for data transfer between the master and a slave during a bus tenure;

said at least one microprocessor having a system interface connected to the system bus for transferring data between the microprocessor and or said system memory and said input/output channel via the system bus; and said system interface including signalling means for normally generating a data termination signal for each data beat in a data transfer, a transfer acknowledge signal asserted by a responding slave indicating normal termination of data transactions, and optionally asserting a single pre-last transfer acknowledge signal by the slave one cycle before a last transfer acknowledge signal is asserted, said arbiter receiving said pre-last transfer acknowledge signal and granting the system bus to the master for a next data tenure eliminating a bus turnaround cycle in cases where bus turnaround may be eliminated without creating bus contention problems between said previous and current data tenures, such cases being where the same slave is involved in consecutive read data bus tenures or when the same master and slave are involved in data bus write tenures, thereby eliminating the bus turnaround cycle and effectively increasing the data bus bandwidth.

7. In a microprocessor bus interface having one or more bus cycles of dead time between data tenures on said bus, said cycles providing data bus turnaround between a previous data tenure and a current data tenure, each of said tenures having a respective master device and a respective slave device, said turnaround allowing said previous master and slave to restore control signals and get off the system bus so as to avoid bus contention problems, a method of eliminating said turnaround between successive read tenures involving the same slave or successive write tenures involving the same master and slave, comprising the steps of:

asserting a pre-last transfer acknowledge signal by said previous slave one cycle before said slave asserts a last transfer acknowledge signal, said last transfer acknowledge signal normally signalling termination of said previous data tenure;

determining whether said previous and current data tenures are such that said turnaround may be eliminated without creating bus contention problems between said previous and current data tenures;

eliminating said turnaround by using said pre-last transfer acknowledge signal of said previous slave to signal termination of said previous data tenure.

8. The method recited in claim 7 further comprising the step of transferring data from a system memory to a microprocessor when the microprocessor is the master of the system bus.

9. The method recited in claim 8 further comprising the step of continuing the bus tenure with each read transfer by broadcasting a next address in memory until the system memory asserts the pre-last transfer acknowledge, effectively executing a burst read tenure initially having an unknown length.

10. The method recited in claim 7 further comprising the step of transferring data from a microprocessor to a system memory when the microprocessor is the master of the system bus.

11. The method recited in claim 10 further comprising the step of continuing the bus tenure with each write transfer by broadcasting a next address in memory until the microprocessor asserts the pre-last transfer acknowledge, effectively executing a burst write tenure initially having an unknown length.

* * * * *